United States Patent Office 3,201,464
Patented Aug. 17, 1965

3,201,464
BORON COMPOUNDS
Michael Peter Brown, East Molesey, Howard B. Silver, Hinchley Wood, Anthony E. Dann, London, and Brian John Ayres, Chessington, England, assignors to United States Borax and Chemical Corporation, Los Angeles, Calif.
No Drawing. Filed Dec. 17, 1962, Ser. No. 244,946
Claims priority, application Great Britain, Jan. 31, 1962, 3,754/62
12 Claims. (Cl. 260—551)

This invention relates to boron compounds comprising a heterocyclic ring, and to their production.

The compounds of the invention are characterized by containing one or two five membered rings each containing a boron atom and a nitrogen atom adjacent to each other, and three carbon atoms. They may be represented by one or other of the structural formulae

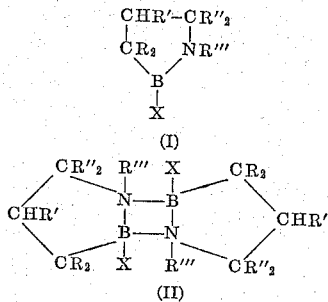

(I)

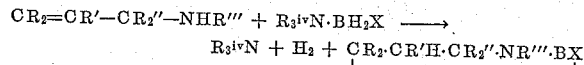

(II)

in which R, R' and R" are the same or different and are hydrogen, halogen, alkyl of 1–4 carbon atoms or aryl; R''' is alkyl of 1–10 carbon atoms, aryl, or a substituted or unsubstituted cycloalkyl group having 5–7 carbon atoms in the ring; and X is hydrogen, alkyl of 1–10 carbon atoms, aryl, a substituted or unsubstituted cycloalkyl group having 5–7 carbon atoms in the ring, a dialkylamino group in which the alkyl groups contain 1–4 carbon atoms and are the same or different, alkoxy or thioalkoxy of 1–10 carbon atoms, aryloxy, or thioaryloxy. Compounds of Formula II are dimers of compounds of Formula I, and can be obtained therefrom as described below. Monomeric compounds of Formula I may suitably be designated azaborolidines. Of special importance are those compounds in which R, R' and R" are hydrogen atoms, R''' is an alkyl or cycloalkyl group, and X is hydrogen, or an alkyl or dialkylamino group.

The azaborolidines of the invention may be made in various ways. One very useful method comprises effecting reaction between an N-substituted allylamine of the general formula $CR_2=CR'-CR_2''-NHR'''$ and a boron compound having at least two hydrogen atoms bonded to the same boron atom. (Throughout this specification the symbols R, R', R" and R''' and X have the meanings given above.) The boron compound may be diborane, a mono-substituted borane $BH_2X$ or a dimer thereof, a borazane of the type $R_3^{iv}N \cdot BH_2X$, $R_2^{iv}NH \cdot BH_2X$ or $R^{iv}NH_2 \cdot BH_2X$ or a borazene of the type $R_2^{iv}N \cdot BH_2$ or $R^{iv}NH \cdot BH_2$. ($R^{iv}$ is used throughout the specification to denote alkyl of 1–4 carbon atoms or aryl; when a compound contains two or three $R^{iv}$ groups they need not be the same.) Alternatively there may be used as the boron source a mixture of a borazane of formula $R_3^{iv}N \cdot BH_3$ with a tri-substituted borane of formula $BY_3$, or an adduct of the type $BY_3 \cdot NR_3^{iv}$, in which the substituents Y may be the same or different and are alkyl of 1–4 carbon atoms, aryl, dialkylamino in which the alkyl groups contain 1–4 carbon atoms and are the same or different, or alkoxy or thioalkoxy of 1–10 atoms. By using such mixtures it is possible to start from readily available starting materials which are equivalent to less readily accessible substances; this can be especially advantageous in making azaborolidines in which X is a dialkylamino, alkyl, alkoxy or thioalkoxy group.

The reaction between the allylamine derivative and the boron-containing compound or mixture of compounds may be carried out in the presence or absence of an inert liquid reaction medium. If a liquid medium is to be used an inert solvent such for example as a hydrocarbon or ether is very suitable. The reaction takes place at an elevated temperature, and may be effected for example by mixing the reactants at or near room temperature and then heating the mixture, or by adding the allylamine derivative to the previously heated boron reactant or reactants or vice versa. If diborane is employed, it may be bubbled through the heated allylamine derivative. Usually the reaction will be effected at a temperature of 50°–190° C., and especially 100°–140° C. The reaction proceeds with evolution of hydrogen, and may be illustrated by the equation $$CR_2=CR'-CR_2''-NHR''' + R_3^{iv}N \cdot BH_2X \longrightarrow$$
$$R_3^{iv}N + H_2 + \overline{CR_2 \cdot CR'H \cdot CR_2'' \cdot NR''' \cdot BX}$$

The product of the reaction is the monomeric compound having the structure of Formula I; it may be separated from the reaction mixture by any suitable method, such as for example as distillation.

On standing, e.g. at room temperature, whether or not they have been isolated from the reaction mixture, the monomers give rise to the corresponding dimers which, if formed in the reaction mixture, may be separated therefrom by any suitable means, preferably by crystallisation and subsequent purification as by washing.

Not all the monomers of structure I dimerise equally readily. Indeed the tendency to dimerisation appears to vary widely, mainly in accordance with the natures of R''' and X. For example, when X is hydrogen dimerisation usually occurs very readily, whereas when X is an amino group it is largely inhibited, as it is also when R''' is a particularly bulky group. The dimers are in general stable at ordinary temperatures and resistant to or only slowly attacked by hydrolysis or oxidation. They can be reconverted into the monomers by heat, e.g. by distillation under reduced pressure, and since the monomers so formed will again dimerise on standing, such distillation provides a useful means for purifying the dimers.

These new boron containing materials have been found to have valuable fungicidal properties and to be of use as additives to fuels used in internal combustion engines. Fungicidal compositions may be prepared in manner known per se by homogeneously dispersing one or more boron compounds of Formula I or II in a solid or liquid carrier of a type customarily employed in the formulation of such compositions.

The invention is illustrated by the following examples:

Example I

Triethylamineborane (4.60 g., 0.040 mole), triethylborane (1.56 g., 0.16 mole) and allylcycohexylamine (8.40 g., 0.059 mole) were placed together in a round-bottom flask and heated in an oil bath. Hydrogen (800 ml., 0.036 mole) was evolved. Distillation under reduced pressure gave 1-cyclohexyl-2-ethyl-1,2-azoborolidine (5.54 g., 0.031 mole, yield 65%) B.P. 96°–101° C./10 mm. (Found: B, 6.4; N, 7.7%. $C_{11}H_{22}BN$ requires B, 6.0; N, 7.8%. Molecular weight found: 185, required 179.) The infrared spectrum of this compound did not include the characteristic frequencies for B—H and C=C. (Volumes of evolved hydrogen are as reduced to 0° C. and 760 mm. pressure in all the examples.)

*Example II*

(Di-n-butylamino)borane (7.60 g., 0.054 mole) and allylcyclohexylamine (7.52 g., 0.054 mole) were mixed together and heated in an oil bath at about 110–130° C. Hydrogen (750 ml., 0.034 mole) was evolved. Distillation under reduced pressure gave a forerun (3.9 g.) which contained some di-n-butylamine and 1-cyclohexyl-2-(di-n-butylamino)-1,2-azaborolidine (5.4 g., 0.020 mole, yield 38%), B.P. 112° C./0.05 mm. (Found: B, 4.0; N, 10.1%; M (molecular weight), 266. $C_{17}H_{35}BN_2$ requires B, 3.9; N, 10.1%; M, 278.)

*Example III*

A mixture of iso-propylallylamine (19.9 g., 0.20 mole) and triethylamine borane (23.0 g., 0.20 mole) was heated under reflux at 100–110° C., and hydrogen (4.1 litres, 0.18 mole) was evolved over a period of 8.5 hours. Distillation under an atmosphere of nitrogen gave a first fraction (20.6 g.), B.P. 86°–110° C., which was shown by infrared examination to be mainly triethylamine, and a second fraction, B.P. 110°–114° C., which was 1-isopropyl-1,2-azaborolidine (14.0 g., 0.13 mole, yield 63%). (Found: B, 10.0; N, 12.2. $C_6H_{14}BN$ requires B, 9.8; N, 12.6%.) On standing for about 15 hours at room temperature, transformation to crystalline dimer (found: M, 226. $C_{18}H_{28}B_2N_2$ requires M, 222) took place, M.P. 77–77.5° C.

*Example IV*

Allylcyclohexylamine (24.2 g., 0.173 mole) and triethylamine borane (19.85 g., 0.173 mole) were placed together in a round-bottomed flask which was heated in an oil bath. At 110°–140° C. hydrogen (3.73 litres, 0.167 mole) was evolved over a period of three hours. Distillation under reduced pressure gave triethylamine (15.5 g.), identified by its infrared spectrum, which was collected in a trap at −78° C., and 1-cyclohexyl-1,2-azaborolidine (14.9 g., 0.097 mole, yield 57%), B.P. 76°–78° C./10 mm. This material completely dimerised over a period of about 24 hours, and was then purified by holding it in vacuo at 50–60° C. to remove volatile impurities, and by redistillation at 10 mm. pressure to give initially the monomeric form which on standing dimerised once more, M.P. 99–101° C. (Found B, 7.1; N, 9.3%. $C_9H_{18}BN$ requires B, 7.2; N, 9.3%.)

We claim:

1. A member of the class consisting of boron compounds of the formulae:

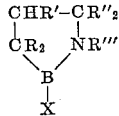

wherein R, R' and R" represent members of the class consisting of hydrogen, halogen, and alkyl groups of 1 through 4 carbon atoms, R''' represents a member of the class consisting of alkyl groups of 1 through 10 carbon atoms, and cycloalkyl groups having 5 through 7 carbon atoms in the ring, and X represents a member of the class consisting of hydrogen, alkyl groups of 1 through 10 carbon atoms, cycloalkyl groups having 5 through 7 carbon atoms in the ring, and dialkylamino groups in which the alkyl groups contain 1 through 4 carbon atoms.

2. 1-cyclohexyl-2-ethyl-1,2-azaborolidine.
3. 1-cyclohexyl-2-(di-n-butylamino)-1,2-azaborolidine.
4. 1-isopropyl-1,2-azaborolidine.
5. 1-cyclohexyl-1,2-azaborolidine.

6. A process for the preparation of an azaborolidine of the formula

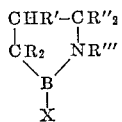

which comprises reacting an N-substituted allylamine of the formula $CR_2=CR'-CR''_2-NHR'''$ with a boron compound selected from the group consisting of diborane, a mono-substituted borane of the formula $BH_2X$ and dimers thereof, compounds of the formulae $R^{iv}{}_3N \cdot BH_2X$,

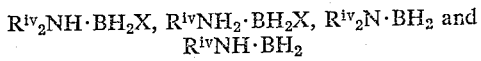

$R^{iv}{}_2NH \cdot BH_2X$, $R^{iv}NH_2 \cdot BH_2X$, $R^{iv}{}_2N \cdot BH_2$ and $R^{iv}NH \cdot BH_2$ where R, R' and R" are selected from the group consisting of hydrogen, halogen, and alkyl of 1 through 4 carbon atoms, R''' is selected from the group consisting of alkyl of 1 through 10 carbon atoms, and cycloalkyl groups having 5 through 7 carbon atoms in the ring, X is selected from the group consisting of hydrogen, alkyl groups of 1 through 10 carbon atoms, cycloalkyl groups having 5 through 7 carbon atoms in the ring, and dialkylamino in which the alkyl groups contain 1 through 4 carbon atoms, and $R^{iv}$ represents alkyl of 1 through 4 carbon atoms.

7. The process according to claim 6 in which said reaction is effected at a temperature of 50° C. to 190° C.

8. The process according to claim 6 in which said reaction is effected at a temperature of 100° C. to 140° C.

9. A process for the preparation of an azaborolidine of the formula

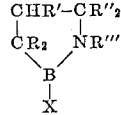

which comprises reacting an N-substituted allylamine of the formula $CR_2=CR'-CR''_2-NHR'''$ with a reactant selected from the group consisting of an adduct of the formula $BY_3 \cdot NR^{iv}{}_3$, and a mixture of a borazane of the formula $R^{iv}{}_3N \cdot BH_3$ and a borane of the formula $BY_3$, wherein R, R' and R" are selected from the group consisting of hydrogen, halogen, and alkyl of 1 through 4 carbon atoms, R''' is selected from the group consisting of alkyl of 1 through 10 carbon atoms, and cycloalkyl groups having 5 through 7 carbon atoms in the ring, X is selected from the group consisting of hydrogen, alkyl of 1 through 10 carbon atoms, cycloalkyl having 5 through 7 carbon atoms in the ring, and dialkylamino in which the alkyl groups contain 1 through 4 carbon atoms, $R^{iv}$ represents alkyl of 1 through 4 carbon atoms, and Y is selected from the group consisting of alkyl of 1 through 4 carbon atoms, and dialkylamino in which the alkyl groups contain 1 through 4 carbon atoms.

10. The process according to claim 9 in which said reaction is effected at a temperature of 50° C. to 190° C.

11. The process according to claim 9 in which said reaction is effected at a temperature of 100° C. to 140° C.

12. 1-alkyl-1,2-azaborolidine in which said alkyl is of 1 through 10 carbon atoms.

References Cited by the Examiner

UNITED STATES PATENTS 3,117,139   1/64   Mooradian _____ 260—240

OTHER REFERENCES

Avery Morton: "The Chemistry of Heterocyclic Compounds," page VI of the preface (1946).

WALTER A. MODANCE, *Primary Examiner.*

JOHN D. RANDOLPH, *Examiner.*